(12) United States Patent
Court et al.

(10) Patent No.: US 6,506,276 B1
(45) Date of Patent: Jan. 14, 2003

(54) METHOD FOR FORMING A CELLULAR CORE MEMBER

(75) Inventors: Calvin Leroy Court, Texarkana, TX (US); Melvin T. Court, Texarkana, TX (US); Calvin Lance Court, Wake Village, TX (US)

(73) Assignee: Newcourt, Inc., Texarkana, TX (US)

(*) Notice: Subject to any disclaimer, the term of this patent is extended or adjusted under 35 U.S.C. 154(b) by 122 days.

(21) Appl. No.: 09/592,082

(22) Filed: Jun. 12, 2000

(51) Int. Cl.$^7$ ............... B32B 32/00; E04C 2/34; B21D 47/00
(52) U.S. Cl. ............ 156/251; 156/254; 156/296; 156/308.2; 156/308.4; 156/256; 29/897.32; 29/430; 29/564; 29/33 T; 29/417; 83/29; 83/34; 83/651.1; 269/289 R
(58) Field of Search ................ 156/251, 254, 156/308.2, 296, 308.4; 52/782.1; 29/897.32, 430, 564, 33 T, 417; 83/29, 34, 651.1; 269/289 R

(56) References Cited

U.S. PATENT DOCUMENTS

| | | | |
|---|---|---|---|
| 1,708,462 A | 4/1929 | Bodman | 52/591.1 |
| 2,055,877 A | 9/1936 | Palmer | 154/128 |
| 2,369,006 A | 2/1945 | Banks | 154/28 |
| 2,477,852 A | 8/1949 | Bacon | 154/45.9 |
| 3,234,639 A | 2/1966 | Dietzsch | 29/411 |
| 3,616,022 A | 10/1971 | Withers | 156/250 |
| 3,625,102 A | 12/1971 | Shino | 83/460 |
| 3,655,475 A | 4/1972 | Stelling, Jr. et al. | 156/197 |
| 3,655,476 A | 4/1972 | Siegal | 156/197 |
| 3,664,906 A | 5/1972 | Hartig | 161/68 |
| 3,773,584 A | 11/1973 | Dietzsch et al. | 156/191 |
| 3,792,562 A | 2/1974 | Gilliam | 53/30 |
| 3,812,230 A | 5/1974 | Takahashi | 264/89 |
| 3,877,690 A | 4/1975 | Owens | 269/265 |
| 3,912,573 A | 10/1975 | Kunz | 156/471 |

(List continued on next page.)

FOREIGN PATENT DOCUMENTS

| | | |
|---|---|---|
| BE | 670027 | 9/1965 |
| CA | 2002568 | 5/1990 |
| CH | 435693 | 11/1967 |
| DE | 1209725 | 1/1960 |
| DE | 2129813 | 12/1971 |
| DE | 2836031 | 2/1980 |
| DE | 3815297 | 11/1989 |
| EP | 0326928 | 8/1989 |
| EP | 0550078 | 7/1993 |
| FR | 1310591 | 10/1961 |
| GB | 628467 | 8/1942 |
| GB | 89110 | 3/1962 |
| GB | 2059802 | 4/1981 |
| JP | 57184065 A | 12/1982 |
| JP | 037956 | 8/1987 |
| WO | WO 99/41061 | 8/1999 |
| WO | WO 99/41062 | 8/1999 |

*Primary Examiner*—Linda Gray
(74) *Attorney, Agent, or Firm*—Jenkens & Gilchrist, P.C.

(57) ABSTRACT

A plurality of thermoplastic tubular segments having substantially equal lengths are arranged in horizontal side-by-side relationship with the respective ends of the tubular segments aligned in a generally common plane. Small portions of the respective ends of the tubes are cut by a thermal cutting device which simultaneously fuses the ends of the tubes to produce a consolidated unitary structure having a thickness defined by the distance between the fused ends of the tubular segments. The consolidated unitary structure is then rotated to a horizontal position, with the tubular segments vertically oriented, and cut along at least one horizontal plane to produce fused cores having a thickness defined by the vertical position of a horizontally disposed thermal cutting device. Cutting consolidated unitary structures of thermoplastic tubular segments along horizontal planes, while the consolidated unitary structure is disposed horizontally, avoids the manufacturing and material handling problems previously associated with vertical cutting of consolidated unitary structures.

12 Claims, 2 Drawing Sheets

U.S. PATENT DOCUMENTS

| | | | |
|---|---|---|---|
| 3,951,022 A | 4/1976 | Hurtes | 83/152 |
| 4,155,800 A | 5/1979 | Wilson | 156/497 |
| 4,250,687 A | 2/1981 | Lueneberg et al. | 53/435 |
| 4,276,249 A | 6/1981 | Holladay | 264/139 |
| 4,351,680 A | 9/1982 | Kohn | 156/79 |
| 4,373,895 A | 2/1983 | Yamamoto et al. | 425/461 |
| 4,541,164 A | 9/1985 | Indave | 29/430 |
| 4,588,543 A | 5/1986 | Huebner | 264/248 |
| 4,606,960 A | 8/1986 | Angel et al. | 428/116 |
| 4,665,679 A | 5/1987 | Watanabe | 53/131 |
| 4,749,032 A | 6/1988 | Rosman et al. | 165/167 |
| 4,755,408 A | 7/1988 | Noel | 428/36 |
| 4,782,570 A | 11/1988 | Spridco | 29/157 |
| 5,032,208 A | 7/1991 | Strauss | 156/251 |
| 5,152,060 A | 10/1992 | Schubert et al. | 29/890.039 |
| 5,240,540 A | 8/1993 | Matsumoto et al. | 156/252 |
| 5,251,420 A | 10/1993 | Johnson | 52/664 |
| 5,630,897 A | 5/1997 | Branca et al. | 156/148 |
| 5,658,644 A | 8/1997 | Ho et al. | 428/188 |
| 5,674,593 A | 10/1997 | Earl | 428/182 |
| 5,683,782 A | 11/1997 | Duchene | 428/116 |
| 5,792,295 A | 8/1998 | Huebner et al. | 156/197 |
| 5,849,393 A | 12/1998 | Slattery | 428/172 |
| 5,851,636 A | 12/1998 | Lang et al. | 428/167 |
| 6,119,344 A * | 9/2000 | Court et al. | 29/897 |
| 6,199,342 B1 * | 3/2001 | Court et al. | 52/664 |

* cited by examiner

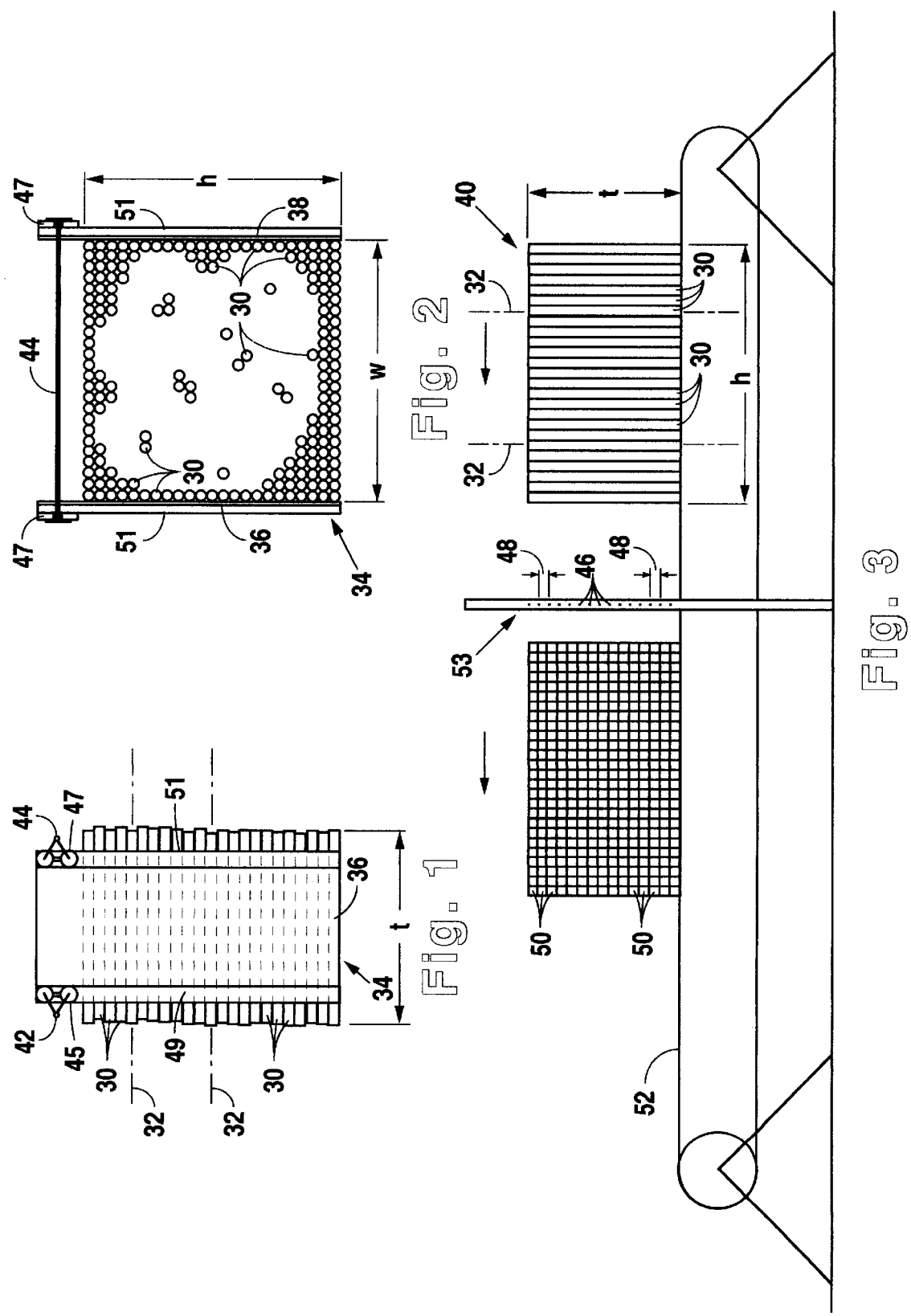

METHOD FOR FORMING A CELLULAR CORE MEMBER

BACKGROUND OF THE INVENTION

1. Technical Field

This invention relates generally to a method for forming open-celled cores for structural panels, and more particularly to such a method in which the cores are formed of segments of thermoplastic tubes.

2. Background Art

Several methods have been proposed for the production of open-celled cores, also commonly referred to as cellular or honeycomb cores, for structural panels. Generally, the prior methods have involved assembling a bundle of preformed tubes, sheets, or other individual components, horizontally and then while the individual tubes are restrained either adhesively or within a press or containment fixture, cutting the horizontally disposed components transversely, in a vertical direction, to form individual cores having a desired thickness.

For example, U.S. Pat. 5,032,208 issued Jul. 16, 1991 to Horst Strauss for PROCESS FOR MANUFACTURING A BUNDLE OF TUBES, teaches a process whereby the tubes are horizontally disposed within a gutter having an open first end and a moveable wall at a second end. While horizontally restrained within the gutter, the tubes are pushed outwardly beyond the open first end by movement of the moveable wall and cut vertically to form cores having a desired thickness. A problem with this method, and other methods which vertically separate a bundle into separate cores, is that the separated core must be supported, during and after cutting, in some manner to prevent it from falling to a horizontal position and breaking. This is a serious problem when cutting large, individual cores from bulky and cumbersome bundles.

In other core fabrication processes, the individual tubes, or components, are preassembled into a unitary structure by the use of an adhesive material, such as glue disposed along the lengths of the individual tubes or segments. For example, U.S. Pat. 5,683,782 issued Nov. 4, 1997 to Ranier Duchene and titled PROCESS FOR PRODUCING OF A HONEYCOMB STRUCTURE AND HONEYCOMB STRUCTURE SO PRODUCED, describes a process using an adhesively active thermoplastic coating to promote bonding between individual honeycomb tubes. In a similar manner, U.S. Pat. 2,477,852 titled STRUCTURAL PANEL CONSTRUCTION, issued Aug. 2, 1949 to C. E. Bacon, describes a structural panel construction in which the individual tubes are assembled by an externally applied adhesive, or by a further curing operation in which fibrous material is impregnated with a partially reacted resinous substance. Operations which require precoating of the individual tubes add complexity, extra cost, and time to the manufacturing process, as well as introducing myriad problems with handling of the coated tubes to prevent premature bonding prior to a desired alignment. In other processes, in which tube bundles are not constrained within a pressure structure during cutting or preassembled into an adhesively joined structure prior to cutting, generally require some form of containment during the cutting operation. For example, Japanese Patent Publication 62-196430 published on Aug. 29, 1987, describes a process for fabricating shock absorber components in which circular bands are disposed around the periphery of a bundle of thermoplastic tubes prior to cutting the bundle in a vertical direction.

The present invention is directed at overcoming the problems set forth above. It is desirable to have a process for separating a preassembled bundle of tubes into individual cores without having the support and handling problems associated with vertical cutting and vertical core separation processes. It is also desirable to have such a process in which the individual tubes are preassembled into a consolidated unitary structure prior to separation into a desired number of core members.

SUMMARY OF THE INVENTION

In accordance with one aspect of the present invention, a method for forming a cellular core member includes forming a plurality of thermoplastic tubular segments having substantially equal lengths defined by spaced apart ends, each thermoplastic segment having a longitudinal axis extending along the length of the segment. The plurality of thermoplastic tubular segments are arranged in side-by-side relationship with the longitudinal axis of each segment disposed horizontally and the ends of the segments generally aligned in a respective common vertical plane. The respective ends of the horizontally disposed segments are thermally cut, and simultaneously fused together in a direction transverse to the longitudinal axis of the segments and in a plane parallel to the general common planar alignment of the ends of the tubes, thereby forming a consolidated unitary structure having a defined height and width and a thickness defined by the distance between the cut ends of the tubular segments. The consolidated unitary structure is then rotated to position whereat the tubular segments are oriented in a-vertical direction. The consolidated unitary structure, with vertically oriented tubular segments, is then moved in a horizontal direction relative to at least one thermal cutting device horizontally disposed at a predefined vertical position between the cut and fused ends of the tubular segments. The consolidated unitary structure is then cut by the thermal cutting device along a horizontal plane parallel to the defined height and width of the consolidated unitary structure with the cut ends of the tubular segments on each side of the cut made by the thermal cutting device being simultaneously fused together, thereby forming separate cores each having a thickness defined by the vertical position at which the horizontally disposed thermal cutting device is positioned.

Other aspects of the method for forming a cellular core member, in accordance with the present invention, include cutting the ends of the horizontally disposed segments in a plane parallel to the general alignment of the ends of the tubes, with a hot wire. In a similar manner, other features include the cutting of the consolidated unitary structure along a horizontal plane whereby separate cores are formed, with a hot wire. Other features include placing the consolidated unitary stricture on a horizontally disposed conveyor belt, after thermally cutting the ends of the horizontally disposed segments and rotating the resultant consolidated unitary structure to a position at which the tubular segments are oriented in a vertical direction. Another feature includes moving the conveyor belt relative to the horizontally disposed, vertically positioned, thermal cutting device.

Still other features of the method for forming a cellular core member, in accordance with the present invention, include wrapping the consolidated unitary structure with a plastic film around the vertically disposed periphery of the consolidated unitary structure prior to moving the unitary structure in a horizontal direction. Still other features include moving the consolidated unitary structure to a temporary storage location prior to moving the unitary structure in a horizontal direction and cutting the consolidated unitary structure along a horizontal plane and simultaneously fusing the cut ends of the tubular segments.

Additional features of the method for forming a cellular core member, in accordance with the present invention, include wrapping two or more consolidated unitary structures, having substantially equal widths and thicknesses, together with a plastic film around the vertically disposed external periphery of the multiple consolidated unitary structures, after rotating the consolidated unitary structures to vertically position the tubular segments, to form an integrated assembly of consolidated unitary structures having a length equal to the combined lengths of the individual consolidated unitary structures prior to moving the integrated assembly of consolidated unitary structures in a horizontal direction.

BRIEF DESCRIPTION OF THE DRAWINGS

A more complete understanding of the method, and structures formed, of the present invention may be had by reference to the following detailed description when taken in conjunction with the accompanying drawings, wherein:

FIG. 1 is a side view of a plurality of horizontally disposed tubular segments having their respective ends generally aligned in a common plane in accordance with an initial step of a preferred embodiment of the present invention;

FIG. 2 is a plan view of the horizontally disposed tubular segments illustrated in FIG. 1;

FIG. 3 is a schematic sequence drawing showing the tubular segments, after being formed into a consolidated unitary structure and rotated, being moved horizontally past a horizontally disposed thermal cutting device whereby the consolidated unitary structure is separated into a plurality of horizontal cores.

DETAILED DESCRIPTION OF PRESENTLY PREFERRED EXEMPLARY EMBODIMENTS

Figure 4:
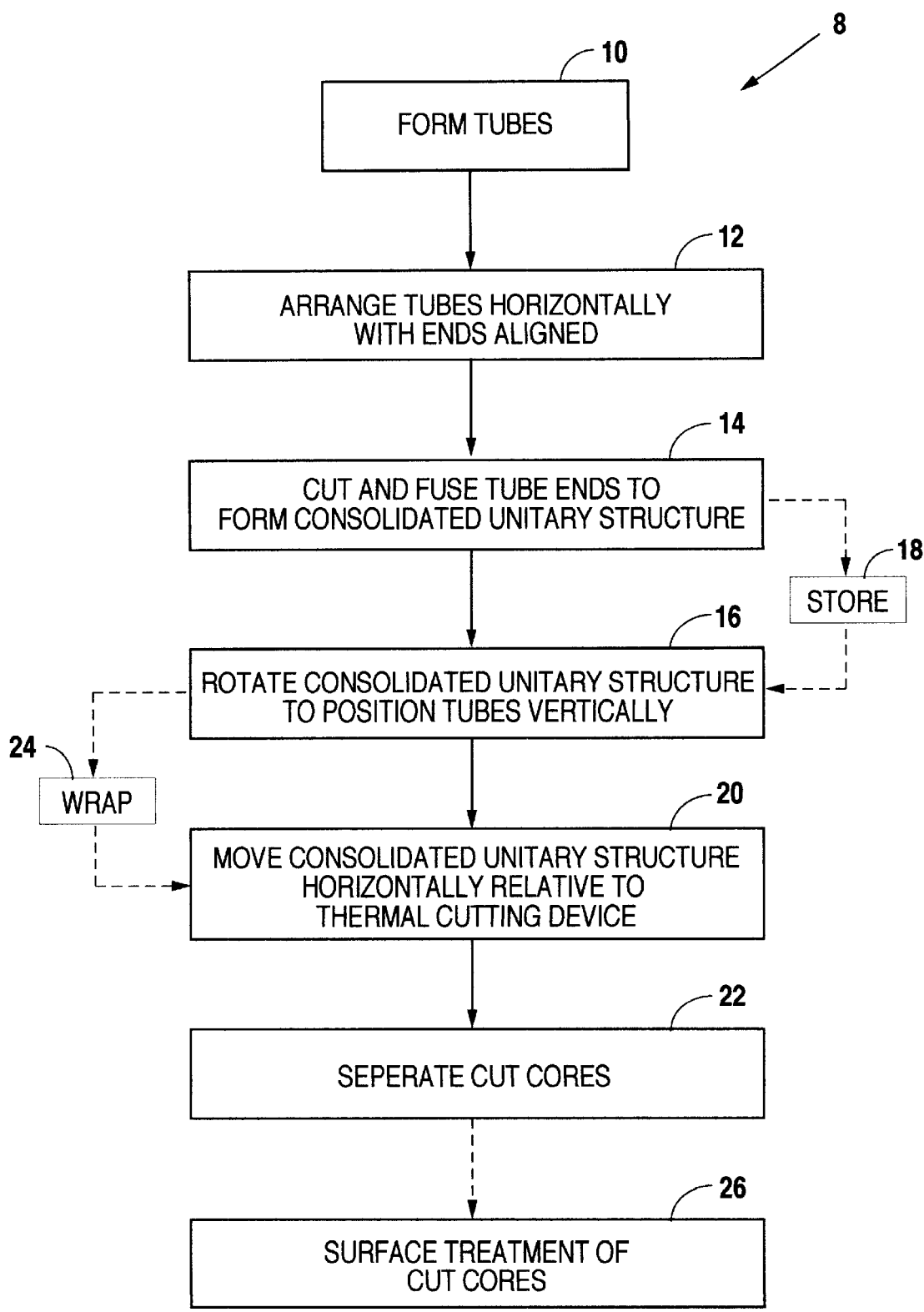
FIG. 4 is a flow diagram illustrating the method for forming a cellular core member in accordance with the present invention.

The method for forming a cellular, or honeycomb, core member in accordance with the preferred embodiments of the present invention is indicated by reference numeral 8 in FIG. 4. In an initial step, represented by block 10, a plurality of thermoplastic tubular segments, such as straws or other hollow shapes 30, are formed to substantially equal lengths defined by spaced apart ends. Each of the tubular segments 30 have a longitudinal axis 32, as indicated in representative ones of the segments 30 illustrated in FIGS. 1 and 3. The tubular segments 30 are advantageously formed by extrusion or other well known techniques, and may be formed of any suitable thermoplastic material, in particular any of the polyolefin family or polyvinyl chloride. More specifically, it has been found that polypropylene, polyethylene, polystyrene, or polyvinyl chloride plastics are particularly suitable for use in forming the thermoplastic tubular segments used in the construction of the cellular, or honeycomb, core members embodying the present invention. The thermoplastic tubular segments 30 may have any of one of several cross-sections, such as circular, triangular, octagonal, square, or other shape. However, it is desirable that all of the tubular segments 30 assembled in a single bundle have the same cross-sectional shape. Also, the tubular segments 30 may have any one of several wall thicknesses, over a relatively large range, to form a core sufficient to meet predefined structural strength and panel compression requirements.

The thermoplastic tubular segments 30 are then arranged in side-by-side relationship with the longitudinal axis 32 of each segment 30 horizontally disposed, and the respective ends of the segments 32 generally aligned in a common vertical plane, as indicated at block 12 of FIG. 4 and illustrated in FIG. 1. In the preferred embodiment of the present invention, the tubular segments 30 are deposited in an open-sided hopper 34 having two spaced apart side walls 36, 38. As illustrated in FIG. 2, the spaced apart distance between the sidewalls 36, 38 of the hopper 34 is indicated by the letter "w," and the height of the segments 30 stacked within the hopper 34 is represented by the letter "h." The height "h" of the stacked tubular segments 30 will define the length of a subsequently formed bun, or consolidated unitary structure, 40 and the distance between the sidewalls "w" will define the width of the subsequently formed bun 40. Thus, it can be seen that if the sidewalls 36, 38 of the hopper 34 are constructed in such a manner as to be moveable, toward and/or away from each other, that the distance "w" could be adjusted to any desired width. If desired, the width "w" may be much greater than that of the height "h," thereby making the width of the subsequently formed bun 40 greater than the length of the bun 40.

The actual formed length of the tubular segments 30, may vary somewhat, for example on the order of up to 1 mm, and still remain within acceptable manufacturing tolerances. For that reason, and additionally due to small misalignments which may occur during placement, the exposed spaced apart ends of the tubular segments 30 will initially not be aligned in a perfect common plane, but will instead be only generally aligned in respective common planes. The slight misalignment of the ends of the tubes is exaggerated in FIG. 1 to illustrate that the initial positioning of the tubes 30 may result in some minor misalignment of the ends, and yet still be generally disposed in respective common planes.

To size the tubes to a common length and fuse the tube ends together to form a consolidated unitary structure, or bun, 40, as indicated at box 14 in FIG. 4, a pair of traveling hot wires 42, 44, illustrated in FIGS. 1 and 2, are disposed, one on each side, at a spaced apart distance "t" so that the hot wires 42, 44 are respectively positioned just inside the spaced apart ends of the tubular segments 30. For example, if the nominal initial length of the cut segments is 30 in. (0.76 m), the spaced apart distance "t" of the hot wires 42, 44 may typically be on the order of about 29.5 in. (0.75 m).

In the embodiment illustrated in FIGS. 1 and 2, each of the traveling hot wires 42, 44 are mounted on a pair of moving carriages 45, 47 respectively, disposed in tracks 49, 51 mounted on the outside surface of the sidewalls 36, 38 of the hopper 34, for vertical movement in an up and down direction. When the traveling hot wires 42, 44 are moved downwardly, preferably simultaneously, after the tubular segments 30 are generally aligned within the hopper 34 as described above, the ends of the tubular segments 30 are cut, producing a small random length end that is scrapped. Simultaneously with cutting in a direction transverse to the longitudinal axis 32 of the segments 30, and consequently in a plane parallel to the initial general alignment of the ends of the tubes 30, the cut ends of the horizontally disposed tubular segments 30 are melted and fused together by the respective thermal cutting devices 42, 44, thereby forming a consolidated unitary structure 40 having a defined height "h," a width "w," and a thickness "t." As described above, the thickness "t" is determined by the spaced apart distance between the hot wires 42, 44. In an illustrative example, a consolidated unitary structure, or bun, 40 may have a thickness of about 29.5 in. (0.75 m), a height "h" of about 50 in. (1.27 m), and a width "w" of about 50 in. (1.27 m).

Heretofore preassembled buns have been cut, or sliced, vertically with the individual tubular segments 30 in the bun 40 disposed horizontally. As described above, in the Background Art section, vertical cutting and separation of a bun into individual cores presents a number of material handling and processing problems. If multiple cuts are made, some arrangement must be made to prevent the separated cores from falling apart after being cut from the bun. If a bun is moved against a stationary thermal cutting device, some means must be made to vertically move the entire bun at a predefined rate. This means that the bun must be retained within some type of a moveable structure that compensates for the varying remaining weight to be cut, during movement against the stationary thermal cutting device. Additionally, the moveable structure must be sufficiently rigid to prevent unintended variation in the movement rate with respect to the stationary thermal cutting device as the bun moves past the thermal cutting device. Also, the separated cores must be caught, separated, and handled in such a manner that will prevent the separated cores from falling and breaking apart.

To prevent the problems associated with vertical cutting of a preassembled bun, the method for forming a cellular core member embodying the present invention includes rotating the consolidated unitary structure 40 to position the tubes vertically, as represented at block 16 of FIG. 4 and illustrated in the right hand portion of FIG. 3.

At this stage of the method 8 for forming a cellular core member, in accordance with the present invention, the consolidated unitary structure 40 may be further processed to form individual core members 50, or if so desired, the consolidated unitary structure 40 may be moved to a storage location for later processing. This flexibility in the manufacturing process 8, as a direct result of initially forming consolidated unitary structures 40 which can be subsequently handled or processed as a single unit, provides the manufacturer the option of drawing a bun 40 from storage and cutting one or more cores 50 of a desired thickness from the bun 40, as needed, at a later time. Thus, the manufacturer may elect to cut a single core 50 from the bun 40, and return the bun 40 to the storage position for subsequent use, and then cut additional cores 50, either singly or in multiples, of whatever thickness is desired. The optional storage election feature of the method for forming a cellular core member in accordance with the present invention is represented by block 18 in FIG. 4.

After rotating the consolidated unitary structure 40 to a position whereat the equally lengthened and fused-end tubular segments 30 are vertically positioned, the resultant horizontally disposed consolidated unitary structure 40 is moved in a horizontal direction with respect to at least one thermal cutting device, such as a hot wire 46, as indicated at block 20 In the illustrated embodiment, the horizontally disposed bun 40 is placed on a conveyor belt 52, preferably having a width at least equal to either the width "w" or the length "h" of the bun 40, whichever is less. The bun 40 is moved, by the conveyor belt, past a cutting station 53 having at least one thermal cutting device, such as a hot wire 46. In the illustrated embodiment, a plurality of hot wires 46 are horizontally disposed in a direction transverse to the direction of movement of the bun 40, as represented by directional arrows in FIG. 3, at a vertically spaced apart distance 48 between each of the wires. Thus, if a core 50 having a thickness of 1 in. (0.025 m) is desired, the spaced apart distance 48 of the stationary hot wires 46 should be 1 in. (0.025 m). Alternatively, the cutting station 53 could be moveable in a horizontal direction and the horizontally disposed bun 40 be positioned on a stationary platform.

As the consolidated unitary structure 40 is moved past the stationary hot wires 46, the structure 40 is sliced into individual cores 50 having a thickness substantially equal to the spaced apart distance 48 between the stationary hot wires 46, and the cut ends of each of the segments is fused to the cut ends of horizontally adjacent segments. Heretofore it has been believed that horizontal cutting, or slicing, of a bun 40 into individual cores 50 would not be practical due to the weight of upper cores causing the vertically adjacent cut ends of the segments 30 in an upper core to immediately refuse with the cut ends of the segments 30 in a vertically adjacent lower core 50, right after moving past the stationary hot wires 46. By the present invention, it has been discovered, that the generally perceived immediate refusing of the cut ends of vertically adjacent cores after moving past a hot wire does not occur. Surprisingly, it has been discovered that the cut ends within each core 50 are fused to each other, but not to the cut ends of segments in a vertically adjacent core 50. As a result, once the consolidated unitary structure 40 has moved past the stationary hot wires 46, as illustrated in the left portion of FIG. 3, the individual cores 50 are fully formed with the ends of the segments 30 fused together. At this stage, the individual cores 50 can be easily lifted from the stack of formed and fused cores 50, as indicated at block 22, and further processed.

In the illustrated embodiment, a plurality of horizontally disposed stationary hot wires 46 are illustrated. However, it should be understood that if it is desired to cut a single core 50, for example a core having a thickness of 2 in. (0.05 m) a single hot wire 46 could be positioned at a vertical distance 2 in. below the top of the horizontally moving bun 40. After moving past the cutting station, the 2 in. (0.05 m) core can be lifted from the remaining bun 40 and processed, and the remaining bun 40 returned to a storage position for subsequent use from which additional fused cores 50 could be cut.

If desired, the vertical surfaces of the bun 40, after rotation of the bun 40 to the horizontal position, can be wrapped with plastic to protect peripherally, outwardly disposed, tubular segments 30 from being displaced while moving through the hot wires 46. The plastic wrap should be a thermoplastic material or a material that can be readily severed by a thermal cutting device 46. The optional wrapping of the bun 40, prior to moving the bun 40 relative to the thermal cutting device 46, is represented by block 24 in FIG. 4.

After formation of the individual cores 50 by the method 8 described above, the surfaces of the fused cores 50 may optionally be further treated, as indicated by box 26, to enhance adhesive retention for subsequent attachment of face panels to the core. The surface treatment may be accomplished by passing the core 50 past an open flame or through a corona discharge field. Such techniques have previously been used to clean and condition the surface of plastic materials to enhance the attachment of labels and ink to plastic bottles and containers. However, this technique is believed to have not been used heretofore to enhance the adhesive retention properties of face surfaces of thermoplastic cores. To the contrary, fabric, scrim layers, and other materials have generally been preattached, either with adhesives or by thermal fusion, to the face surface of thermoplastic cores to enable the subsequent attachment of face panels to the cores.

Also, while traveling hot wires 42, 44 and a stationary hot wire 46, have been used in the above described illustrative embodiments, other thermal cutting devices, such as a laser or a heat-producing mechanical saw, could be used in carrying out the simultaneous tube end cutting and fusing operations described above with respect to boxes 14 and 20. Also, it should be recognized that, while more cumbersome, the traveling hot wires 42, 44 could be stationary hot wires and the segments 30, retained within some form of constraint structure, could be moved past the stationary hot wires. In like manner, as discussed above, the stationary hot wires 46 could be traveling hot wires, moving in a horizontal direction, with the bun 40 disposed in a stationary horizontal position.

Although the present invention is described in terms of a preferred exemplary embodiment, with specific illustrative key steps in carrying out the method for forming a cellular, or honeycomb core member 50, those skilled in the art will recognize that changes in the order in which certain of these steps are carried out may be made without departing from the spirit of the invention. For example, if it is desired to place the consolidated unitary structure 40 in a temporary storage position, such storage could be carried out either before or after rotating the consolidated unitary structure 40 to a horizontal position. In like manner, the wrapping of the consolidated unitary structure 40 with an external plastic wrap around the periphery of the structure 40 defined by the lengths of the tubular segments 30 may be carried out either before or after the consolidated unitary structure 40 is rotated to a horizontal position. Also, subsequent processing of the fused cores 50, such as by placing the cores in a press with heated platens to size the thickness of the cores to a selected thickness, may be carried out without departing from the spirit of the invention. Such changes are intended to fall within the scope of the following claims. Other aspects, features, and advantages of the present invention may be obtained from a study of the disclosure and the drawings, along with the appended claims.

What we claim is:

1. A method for forming a cellular core member, comprising:

forming a plurality of thermoplastic tubular segments having substantially equal lengths defined by spaced apart ends, each segment having a longitudinal axis extending along the length of said each segment;

arranging said plurality of thermoplastic tubular segments in side-by-side relationship with the longitudinal axis of each segment being horizontally disposed and the ends of the tubular segments being generally aligned in respective common vertical planes;

thermally cutting the ends of the horizontally disposed segments in a direction transverse to the longitudinal axis of each segment and in a plane parallel to the common vertical plane in which the ends of the segments are generally aligned and simultaneously filsing the cut ends of the horizontally disposed tubular segments together, thereby forming a consolidated unitary structure having a defined height and width, and a thickness defined by the distance between the cut ends of the tubular segments;

rotating said unitary structure to a position at which the longitudinal axes of the tubular segments comprising the, consolidated unitary structure are vertically disposed moving said consolidated unitary structure in a horizontal direction relative to at least one horizontally disposed thermal cutting device positioned at a preselected vertical position between the cut ends of the tubular segments;

cutting said vertically disposed consolidated unitary structure along a horizontal plane and simultaneously fusing the cut ends of the tubular segments cut by the horizontally disposed thermal cutting device positioned at said preselected vertical position, thereby forming separate cores each having a height and width defined by the height and width of the consolidated unitary structure and a thickness defined by the predefined vertical position at which said horizontally disposed thermal cutting device is positioned.

2. The method for forming a cellular core member, as set forth in claim 1, wherein said thermally cutting the ends of the horizontally disposed segments in a direction transverse to the longitudinal axis of each segment includes cutting the segment ends with a hot wire.

3. The method for forming a cellular core member, as set forth in claim 1, wherein said cutting said consolidated unitary structure along a horizontal plane parallel to the predefined width and height of the consolidated unitary structure includes cutting the consolidated unitary structure with at least one horizontally disposed hot wire.

4. The method for forming a cellular core member, in accordance with claim 1, wherein said rotating said unitary structure to a horizontal position includes placing a rotated consolidated unitary structure on a horizontally disposed conveyor belt.

5. The method for forming a cellular core member, as set forth in claim 4, wherein said moving said horizontally disposed unitary structure in a horizontal direction includes moving the conveyor belt relative to a stationary horizontally disposed thermal cutting device.

6. The method for forming a cellular core member, as set forth in claim 1, wherein said method includes wrapping said consolidated unitary structure with a plastic film around a vertically disposed periphery of the consolidated unitary structure prior to moving the consolidated unitary structure in a horizontal direction.

7. The method for forming a cellular core member, as set forth in claim 6, wherein said method includes moving said consolidated unitary structure to a temporary storage location prior to moving the unitary structure in a horizontal direction relative to at least one horizontally disposed thermal cutting device.

8. The method for forming a cellular core member, as set forth in claim 1, wherein said method includes wrapping two or more contiguously positioned, horizontally disposed and aligned consolidated unitary structures having substantially equal widths and thicknesses with plastic film around exposed external peripheral surfaces of the contiguously positioned consolidated unitary structures to form an integrated assembly of consolidated unitary structures having a length equal to the combined heights of the individual consolidated unitary structures prior to moving said assembly of consolidated unitary structures in a horizontal direction to at least one horizontally disposed thermal cutting device.

9. The method for forming a cellular core member, as set forth in claim 8, wherein said method includes moving the assembled consolidated unitary structures having plastic film wrapped around the external peripheral surfaces of the integrated assembly of consolidated unitary structures to a temporary storage location prior to moving the assembled consolidated unitary structures in a horizontal direction relative to at least one horizontally disposed thermal cutting device.

10. The method for forming a cellular core member, as set forth in claim 1, wherein said method includes treating said cores cut from the consolidated unitary structure having respective ends of the tubular segments fused together to promote adhesive retention at said fused ends.

11. The method for forming a cellular core member, as set forth in claim 10, wherein said treating of said cores to promote adhesive retention includes passing the cores past an open flame.

12. The method for forming a cellular core member, as set forth in claim 10, wherein said treating said cores to promote adhesive retention includes passing said cores through a corona discharge field.

\* \* \* \* \*